United States Patent [19]
Giebler
[11] 3,783,183
[45] Jan. 1, 1974

[54] ARRANGEMENT FOR THE CONNECTING OF TRANSMISSION DEVICES TO A PROGRAM CONTROLLED ELECTRONIC DATA EXCHANGE SYSTEM

[75] Inventor: Fritz Giebler, Munich, Germany
[73] Assignee: Siemens Aktiengesellschaft, Berlin and Munich, Germany

[22] Filed: Apr. 20, 1971
[21] Appl. No.: 135,573

[30] Foreign Application Priority Data
Apr. 30, 1970 Germany .................. P 20 21 339.2

[52] U.S. Cl. .................................................. 178/3
[51] Int. Cl. .............................................. H04l 15/00
[58] Field of Search ........................ 178/3, 2 R, 2 A, 178/2 D, 63 E, 69 R, 69 N, 69 B, 69 C, 18 FF, 79, 58, 68; 179/2 DP, 16 A, 15 AD, 170 G, 170 T, 15 AZ; 340/413; 333/12, 99; 307/264, 255, 313; 330/13

[56] References Cited
UNITED STATES PATENTS

| | | | |
|---|---|---|---|
| 3,585,407 | 6/1971 | Vinson | 307/313 |
| 3,610,834 | 10/1971 | Gueldenpfennig | 179/16 A |
| 3,465,101 | 9/1969 | Christian et al. | 178/68 |
| 3,519,743 | 7/1970 | Herter | 178/58 |
| 3,401,380 | 9/1968 | Bell et al. | 178/2 R |
| 3,621,141 | 11/1971 | Mack | 178/68 |
| 3,308,309 | 3/1967 | Wichmann | 307/237 |

*Primary Examiner*—William C. Cooper
*Assistant Examiner*—David L. Stewart
*Attorney*—Birch, Swindler, McKie & Beckett

[57] ABSTRACT

A circuit arrangement is described for transmitting binary signals at high speeds between data signal transmission devices and system connections of a program controlled data exchange, even though the latter elements may be remotely located one from the other. Interface lines interconnect the system connections and the transmission device for data traffic in either direction therebetween. Each interface line end is connected to one of a sending circuit or a receiving circuit. The sending circuit transmits either of two voltage levels corresponding to the logic levels and maintains a constant internal resistance, regardless of the voltage being transmitted. The receiving means has a threshold value intermediate of the two binary voltage levels. Conventional cable having multiple lines is used for the interface cable, and a portion of the lines therein are grounded at both ends to prevent inter-line disturbance.

3 Claims, 4 Drawing Figures

ARRANGEMENT FOR THE CONNECTING OF TRANSMISSION DEVICES TO A PROGRAM CONTROLLED ELECTRONIC DATA EXCHANGE SYSTEM

BACKGROUND OF THE INVENTION:

The invention relates to an arrangement for the transmission of binary signals at high speeds between the system connections which process the signals in a program controlled electronic data exchange system and the data signal transmission devices used in such systems.

For the exchange of binary information systems are known which directly transmit the binary data, as such, from, for example, a central memory to the position where the data will be used. For the connection of information channels, such a system utilizes so called system connections along with transmission devices, both of which elements are known. As discussed in the U.S. Patent cited hereinbelow the system connections are logic circuits for carrying out line connection operations. The construction of a system connection unit containing a plurality of such system connections for a data exchange system of the above named type is described, for example, in U.S. Pat. No. 3,717,723. With each of these system connections, an individual line switching part constructed in so-called "transistor - transistor - logic" is associated. In the following, the expression TTL-switching circuit technology will always be used for this concept.

For such a data exchange system to work properly it is necessary that there be cooperation between the system and the transmission devices. In this context, there is a special problem in that the transmission devices or their connections, to which the subscriber and long distance lines of the transmission network are connected, often are to be connected to the system connections of the data exchange system over distances of the order of magnitude of 100 to 200 meters. However, the system connections of the data exchange system are primarily designed for the processing of logical signals and are constructed accordingly, using, for example, TTL switching circuit technology. In view of the fact that the rapid transmission of logic signals can take place over relatively small distances the problem is manifest. Even over the short distances, special requirements are placed on the quality of the transmission means used, so that the use of conventional cable is impossible.

It is, therefore, an object of the invention to provide an arrangement for the transmission of binary signals at high speeds between the system connections which process logical signals in a data exchange system of the above mentioned type and the transmission devices.

SUMMARY OF THE INVENTION

In accordance with the invention, this and other objects are attained in that an interface device is provided, which has interface lines on both sides connected over devices which send on the interface lines and which receive from the interface lines. Each individual interface line extends between the program controlled data exchange system, and the data signal transmission device. A device for sending signal voltage through the interface line under the control of logical signals is provided which has, for each logic signal level, the same internal resistance. A device receiving from the interface line is provided which has a threshold voltage level which lies in between the voltage values transmitted on the interface line.

It is especially advantageous if the binary signals sent out by the sending device and the binary signals received by the receiving device, are modified signals of the TTL technology. If one used, as suggested by the invention, ground potential (0volts) for the transmission of the binary signal corresponding to the logical zero and the supply voltage of the TTL switching circuit (e.g., +5 volts) for the transmission of the binary signal corresponding to the logical one, it results that a well defined logical i.e., a rest potential for un uncompleted connection, condition, which can be associated with the release condition, is given at interruptions (e.g., spurious grounds and short circuits) of the line. It is possible, as further suggested by the invention, to construct the sending device as an output switching circuit and the receiving device as an input switching circuit using integrated circuit technology. They may be parts of the system connections of the data exchange system and the transmission device. This has the advantage that the total required expenditure is minimized and, simultaneously, a correspondingly high packing density can be achieved, whereby construction and wiring are simplified.

Through the use of an output circuit which sends on the interface line, which output circuit has the same internal resistance for both of the logic level conditions appearing at its input, it is achieved that both switching states have the same dynamic characteristics. The rise times of the signals, so generated, per unit line length can, thereby, be minimized. The input circuits, which receive the binary signals from the interface line, always produce signals having steep leading edges, which are suitable for the control of TTL-switching circuits. The invention allows normal multiple line cable to be used with special advantage as the transmission means between the system connections of the data exchange system and the connections of the transmission devices.

BRIEF DESCRIPTION OF THE DRAWINGS

The invention will be best understood by reference to the description hereinbelow of an exemplary embodiment constructed according to the principles of the invention in conjunction with the drawings in which.

DETAILED DESCRIPTION OF THE DRAWINGS

Figure 1:
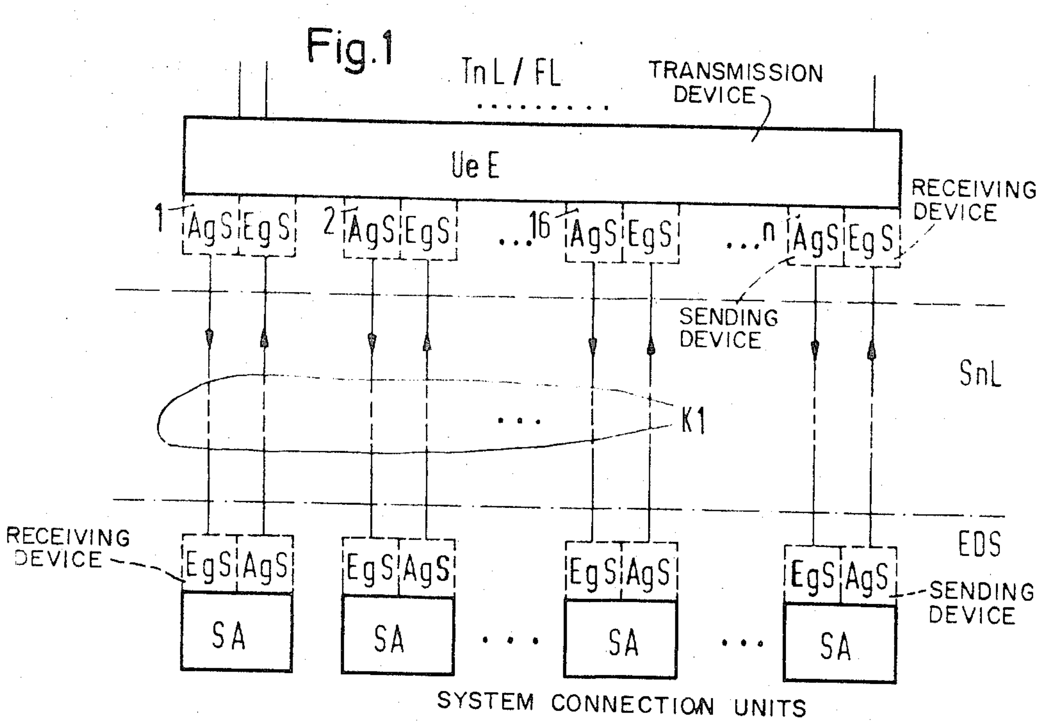
FIG. 1 is a block circuit diagram of the connection arrangement between the transmission device and the system connections of the electronic data exchange system, according to the principles of the invention.

The arrangement represented in FIG. 1 contains in its top portion, a conventional data signal transmission device UeE, to which the subscriber lines TnL or long distance lines FL are connected. A connection between the transmission device UeE and the data exchange system EDS exists, in accordance with the invention, over the interface lines SnL. The interface lines are connected on their ends, respectively, to a sending device and a receiving device. The lines SnL are formed in pairs for bidirectonal transmission between each system connection SA and the data signal transmission device. The devices sending on the interface lines, which function as output circuits, are designated AgS; the devices receiving from the interface lines, which function as input circuits, are designated EgS. Because at the transmission device UeE, as well as at the data exchange system EDS, the connections are provided individually for each line, the arrangement of FIG. 1 contains an output circuit AgS and an input circuit EgS for each of the individual lines 1, 2, 16 through *n*. The fact that the output and input circuits can in any case be integrally combined in the transmission device UeE or in the system connections SA of the data exchange system is symbolized in FIG. 1 in that the said circuits are shown in dotted lines.

The above described arrangement, according to the invention, operates by the output circuits AgS sending modified signals according to the TTL-switching circuit techniques and the input circuits EgS receive such signals. The signals transmitted on the interface lines SnL are either zero volts (logic zero) or plus five volts (logic one). Of course, other voltages may be used. Using this signal arrangement there arises a relationship to the start signal and stop signal usual in telegraphy technology. Through this association each input circuit (input switch) is in a position to recognize an interruption of the interface line or a grounding or short circuit on an interface line as a start signal, which corresponds in telegraphy technology to the rest potential by an incomplete connection and is evaluated as a release signal for an existing connection.

Figure 2:
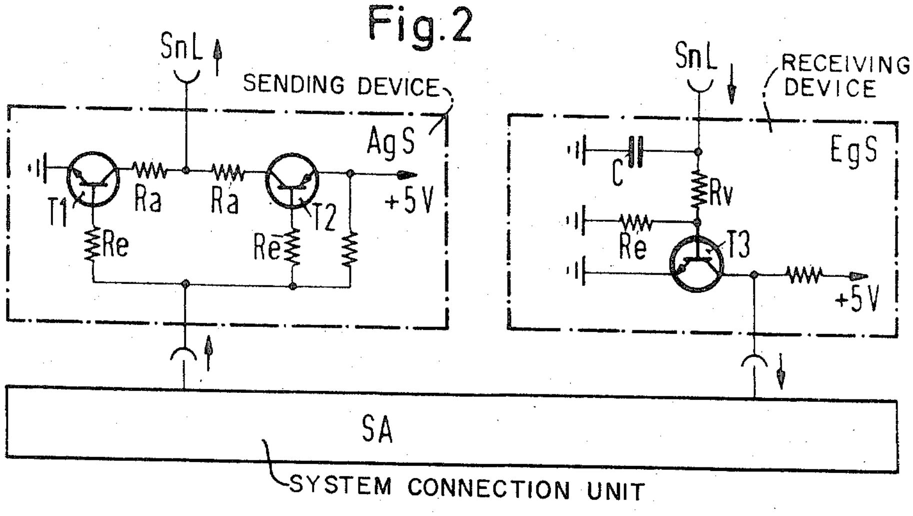
FIG. 2 is a schematic circuit diagram of preferred embodiments of the output circuit for sending on an interface line and of an input circuit for receiving from an interface line.

FIG. 2 illustrates exemplary circuits for output circuit AgS and input circuit EgS. The output circuit AgS is applied at its input with the logic signals by a system connection SA. At its output, it sends signals depending on the logic signal appearing at the input, namely, 0 volts (corresponds to logical 0) and +5 volts (corresponds to logical 1) to the interface line SnL associated therewith. The input circuit EgS receives the binary signals 0 volts and +5 volts, at its input from the interface line SnL associated with it. The input circuit EgS is connected at its output terminal, with the system connection SA or is integrated therein. The output circuit (switch) as well as the input circuit may be constructed in technology similar to TTL.

The output circuit AgS contains therein two transistors T1 and T2 having bases connected over a resistor Re with the signal input. The collector electrodes are, respectively, connected through two equally sized resistors Ra with the output of the circuit AgS. The emitter of the npn-transistor T1 is grounded, while the emitter of the pnp-transistor T2 is connected to the supply voltage, +5 volts. In this manner, it is achieved that the output circuit has the same internal resistance in any given case for both circuit conditions; namely, for the sending binary zero and for sending the binary one. That is, the internal resistance, as seen from line SnL, will essentially be determined by one of the resistances Ra, depending on which of the transistors is conducting. The change of level of the binary signal on the interface line SnL is coupled to it with equal wave edges. That means, that the dynamic characteristics are equal during both switching conditions of the output circuit AgS.

The input circuit EgS, which converts the binary signals incoming over the interface line SnL into signals for the succeeding TTL-switching circuits, contains a transistor T3, with its base connected over a resistor Re with the ground and over a resistor RV with the input of the circuit. The emitter of the npn-transistor T3 is also grounded. The collector of the transistor forms the output of the input circuit EgS. Once again, +5 volts serves as supply voltage. In accordance with the invention, the input circuit EgS has a threshold value which lies in the middle between the binary signal levels on the interface line. As previously described, the voltages 0 volts and +5 volts are transmitted over the interface lines as binary signals. Accordingly, the threshold value of the input circuit in the present example is +2.5 volts. Thereby, the advantage is achieved that a reliable transmission of the binary signals is possible over relatively inexpensive circuit cable, for example, over unshielded circuit cable. For an explanation of the problems connected therewith, FIG. 3 will now be discussed.

Figure 3:
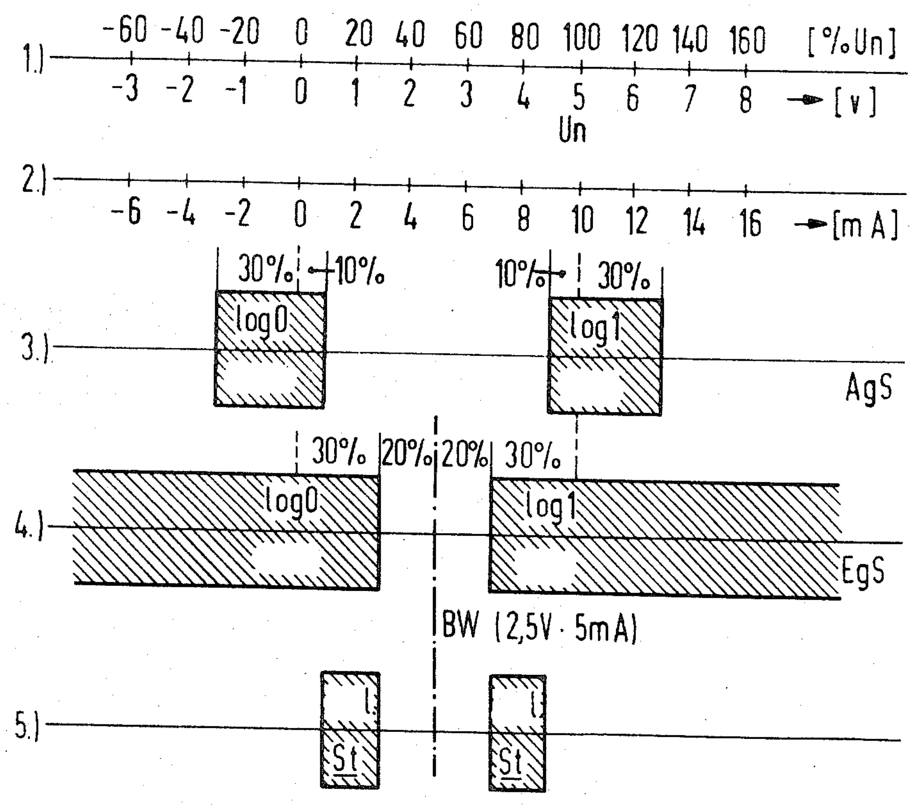
FIG. 3 is a chart indicating the tolerance requirements which are placed on the output - and the input circuits and, FIG. 4 illustrates preferred arrangements of the interface lines in a conventional cable.

In FIG. 3, in a first line, the voltage values prevailing on the interface lines are given. In a second line, the currents corresponding to the voltages are given. In a third line, the tolerance region of the output circuit AgS is given and in a fourth line, the tolerance region of the input circuit EgS is given. Finally, in a fifth line, the allowable disturbance superposition during the transmission of a binary signal corresponding to the logical zero and the allowable disturbance superposition during the transmission of a binary signal corresponding to the logical one are given. One sees with reference to this figure that the output switch AgS safely guarantees the sending out of a binary signal 0 volts (start signal) with a tolerance of −30 percent and +10 percent with reference to the logical signal zero at the input of the output switch. The sending of a binary signal (stop signal) corresponding to the logical signal one is guaranteed with a tolerance of −10 percent and +30 percent with reference to the logical signal one at the input of the output switch.

The input circuit EgS has, as follows from line 4 of FIG. 3, a threshold value BW, which lies in the middle between the value of the binary signal on the interface line determined by the two conditions to be transmitted. In the cited example, this threshold value BW is the voltage +2.5 volts or the current 5mA. The receipt of a binary signal (start signal) corresponding to the logical zero is guaranteed with a tolerance of +30 percent, with reference to the value of the binary signal corresponding to the logical zero, and the receipt of a value of the binary signal (stop signal) corresponding to the logical one is guaranteed with a tolerance of −30 percent, with reference to the value corresponding to the logical one. There results an allowable disturbance influence given in line 5 of FIG. 3, of a binary signal corresponding to a start signal or a stop signal. The allowable disturbance influence has been there designated with St. The tolerances, which can be prescribed for the output circuit and for the input circuit are so large that the tolerances of the supply voltage, of the threshold voltage of the utilized semi-conductor elements, for example, of the transistors or the switching of the voltage, the tolerances of the threshold itself, and the tolerances of all of the resistors which determine the currents in the interface line including that of the internal resistance of the output circuit can be taken into account.

For further improvement with respect to disturbance influences, which are caused, for example, by mutual disturbances between of a plurality of interface lines, a capacitor C is present in the input circuit, over which the disturbance impulses arising on the line are short circuited to the ground.

Figure 4:
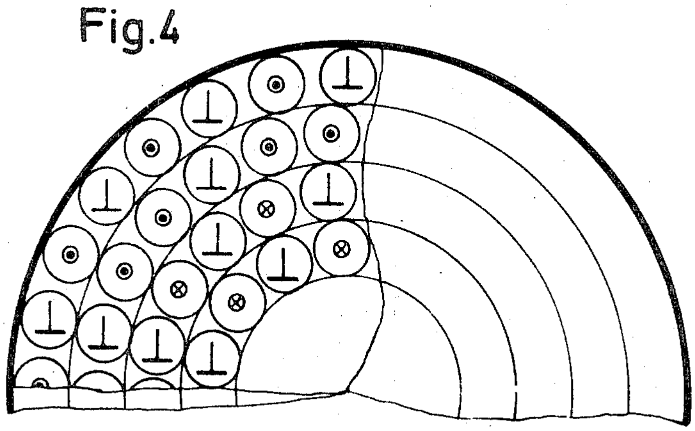

The characteristics of the described arrangement make it possible, as previously pointed out, to utilize the lines of conventional circuit cable as interface lines. In any given case, two interface lines; namely, one for each direction, of a number, for example, 16, of connections can thereby be combined in one cable. Such a cable has been designated in FIG. 1 as K1. To minimize the disturbance voltages arising through mutual influencing of the lines, it is advantageous to provide additional lines, which are grounded at both ends of the cable. In FIG. 4, an example of the wiring of a circuit cable with interface lines is given. The circuit cable utilized in this example contains four layers, whereby in the first layer every second line, in the second layer every third line and in the third and fourth layers, once again every second line is grounded at both ends. It has been determined that such an arrangement in accordance with the invention a reliable transmission of binary signals over normal circuit cable up to a length of from 100 to 200 meters is safely possible.

I claim:

1. Apparatus for high speed transmission of binary signals between data signal transmission means coupled to outgoing transmission lines and a program controlled data exchange installation comprising:

interface lines interconnecting said data signal transmission means and system connections of said exchange for signal traffic in either direction therebetween, sending means for sending over said interface lines either of two voltage signals of different absolute magnitudes derived from the two binary signal levels to be transmitted, said sending means having an internal resistance which is constant for either voltage output, said sending means comprising switching means having first and second switcing states corresponding to said two binary signal levels, and receiving means for receiving either of said two voltage signals from said interface lines and for reproducing said binary signal levels therefrom, said receiving means having a threshold level intermediate of said two voltage signals.

2. The apparatus defined in claim 1 wherein the signal corresponding to logical zero is at ground potential and corresponds to the rest potential of an uncompleted connection and the signal corresponding to logical one is at the supply voltage of said sending means.

3. The appratus defined in claim 1 wherein said interface lines are multiple line cables wherein individual ones of said multiple lines carry no signal and are grounded at both ends.

* * * * *